United States Patent
Yu et al.

(10) Patent No.: US 8,403,567 B2
(45) Date of Patent: Mar. 26, 2013

(54) OPTICAL FIBER CONNECTOR

(75) Inventors: Tai-Cherng Yu, Tu-Cheng (TW);
Kun-Chan Wu, Tu-Cheng (TW);
I-Thun Lin, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 214 days.

(21) Appl. No.: 13/012,814

(22) Filed: Jan. 25, 2011

(65) Prior Publication Data

US 2012/0008901 A1 Jan. 12, 2012

(30) Foreign Application Priority Data

Jul. 12, 2010 (TW) .............................. 99122837 A

(51) Int. Cl.
*G02B 6/38* (2006.01)
*G02B 6/36* (2006.01)
(52) U.S. Cl. ................ 385/74; 385/53; 385/55; 385/58; 385/59; 385/60; 385/64; 385/70; 385/71; 385/72; 385/73

(58) Field of Classification Search .................... 385/60, 385/64, 74
See application file for complete search history.

(56) References Cited

U.S. PATENT DOCUMENTS

| 5,241,612 A * | 8/1993 | Iwama ............................. 385/74 |
| 5,339,376 A * | 8/1994 | Kakii et al. ...................... 385/71 |
| 6,340,247 B1 * | 1/2002 | Sakurai et al. .................. 385/78 |

* cited by examiner

*Primary Examiner* — Ryan Lepisto
(74) *Attorney, Agent, or Firm* — Altis Law Group, Inc.

(57) ABSTRACT

An optical fiber connector includes a female connector and a male connector. The female connector includes a first main body and a first lens portion. The first main includes at least one positioning slit and at least one recess defined in an inner surface of the first main body in the at least one positioning slit. The male connector is used for engagement with the female connector, and includes a second main body and a second lens portion for optically coupling with the first lens portion. The second main body includes at least one positioning post configured for insertion into the corresponding at least one positioning slit and at least one protrusion protruding from the at least one positioning post configured for insertion into the corresponding at least one recess.

6 Claims, 4 Drawing Sheets

OPTICAL FIBER CONNECTOR

CROSS REFERENCE TO RELATED APPLICATION

This application is related to a commonly-assigned copending application, application Ser. No. 12/954,617, filed on Nov. 25, 2010 and entitled "OPTICAL FIBER CONNECTOR AND RELATED OPTICAL FIBER CONNECTOR ASSEMBLY". The disclosure of the above-identified application is incorporated herein by reference.

BACKGROUND

1. Technical Field

The present disclosure relates to an optical fiber connector.

2. Description of Related Art

Optical fiber connectors are widely used as interfaces for high-speed transmission of electronic data between computers and peripheral apparatus, such as scanners, digital cameras, mobile phones, music players, and others. The optical fiber connector often includes a female connector and a male connector each having a main body, at least two optical lens portions protruding from the main body, and at least two optical fibers accommodated in the main body. When in use, the male connector is received in the female connector, the lens portions of the female connector face the corresponding lens portions of the male connector, and electronic data is transmitted.

How precisely each lens portion of the female connector is optically coaxial with the corresponding lens portion of the male connector plays a vital role in transmission loss. Therefore, it is desired to provide an optical fiber connector exhibiting low transmission loss.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present optical fiber connector will now be described in detail and with reference to the drawings.

Figure 1:
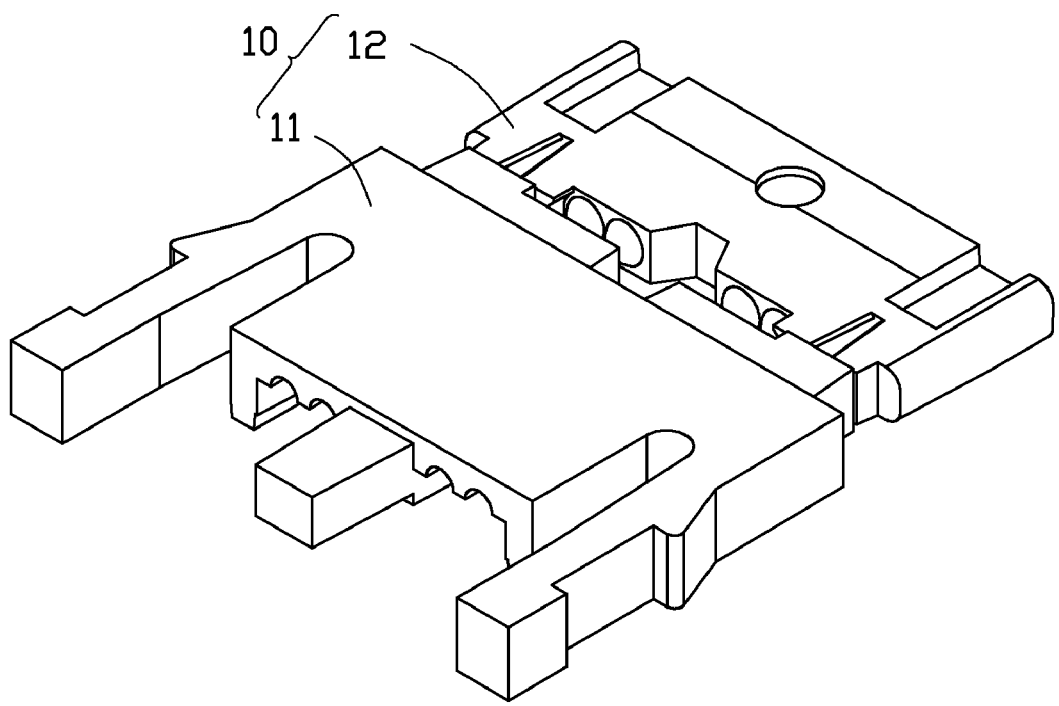
FIG. 1 is an isometric assembled view of an optical fiber connector in accordance with an exemplary embodiment, the optical fiber connector including a female connector and a male connector.
Figure 2:
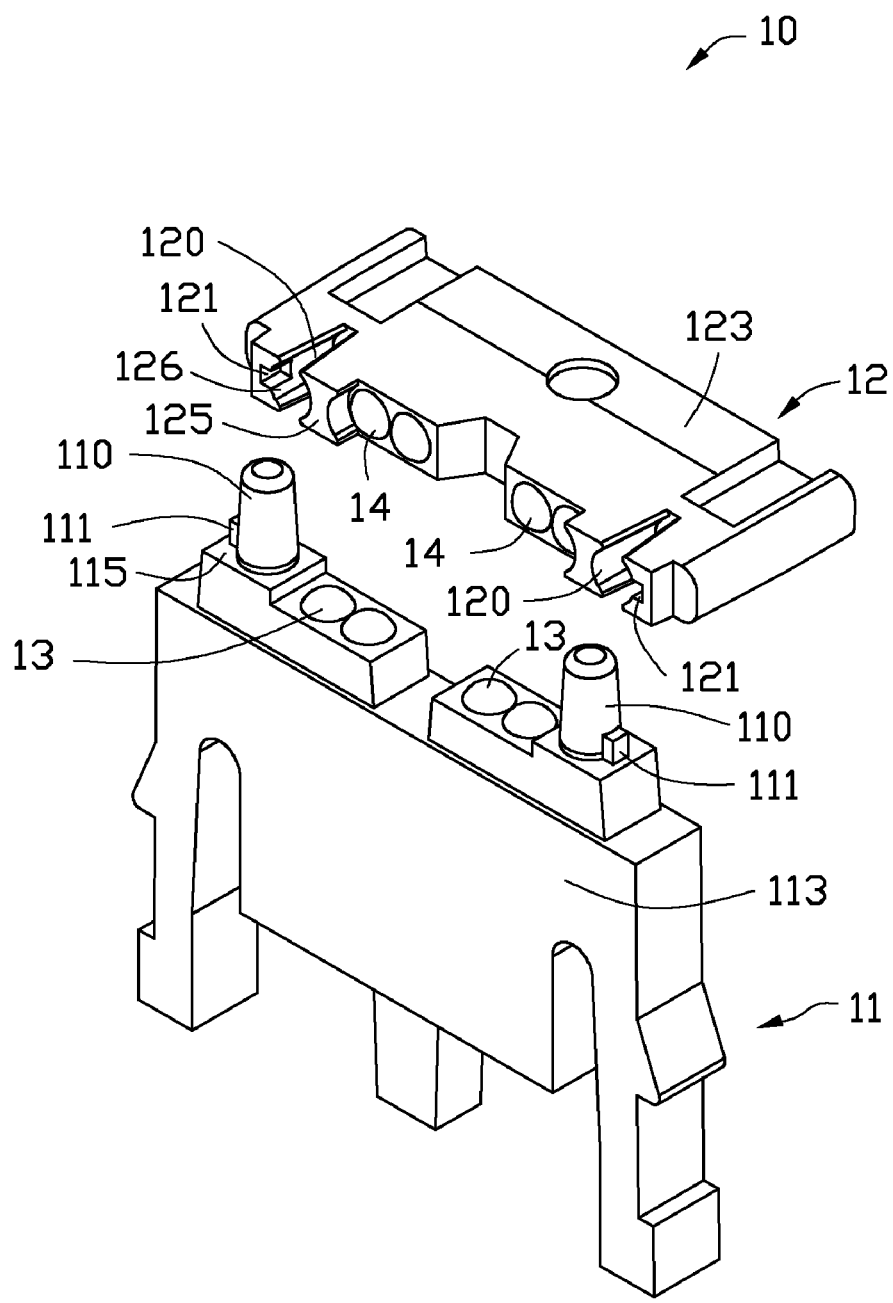
FIG. 2 is a disassembled view of the optical fiber connector of FIG. 1.

Referring to FIGS. 1 to 2, an optical fiber connector 10 according to an exemplary embodiment of the present disclosure includes a female connector 12 and a male connector 11 insertably received in the female connector 12. The female connector 12 is generally assembled in a host computer, and the male connector 11 is portable and configured for insertion into the female connector 12 and connection with a computer peripheral apparatus, such that data is transmitted between the host computer and the computer peripheral apparatus.

Figure 3:
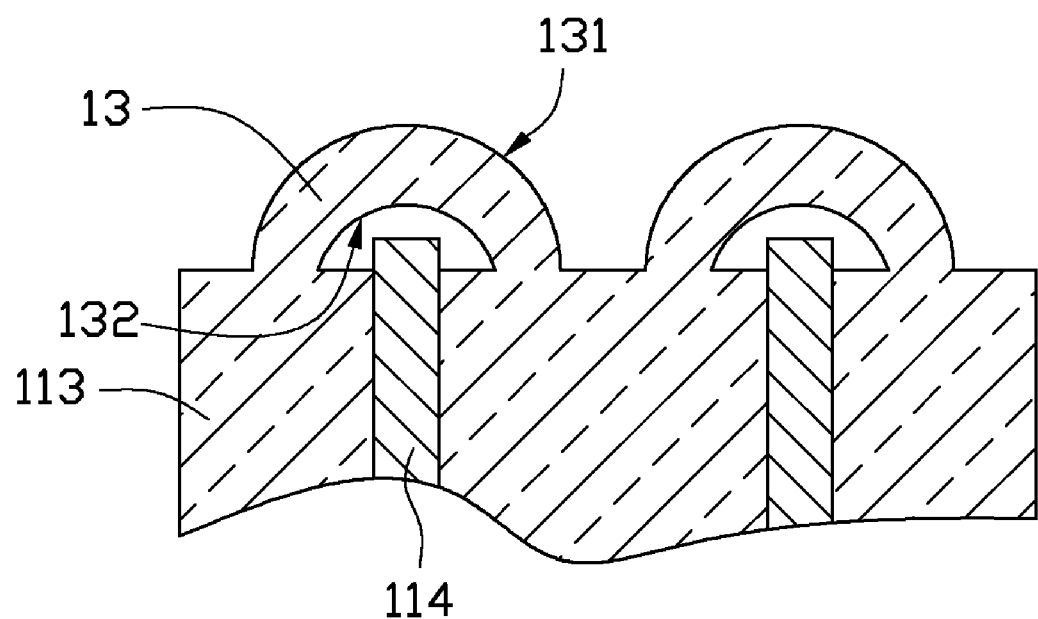
FIG. 3 is a cross-sectional view of the male connector of FIG. 1, taken along line III-III.

In detail, referring to FIGS. 2 and 3, the male connector 11 encompasses a first main body 113, four first lens portions 13, and four first optical fibers 114. The first main body 113 includes a first end surface 115, two positioning post 110 and two protrusions 111 respectively protruding from the first main body 113 at the first end surface 115. Each first lens portion 13 includes a first optical surface 131 and a first coupling surface 132 opposite to the first optical surface 131. Each of the two positioning posts 110 is respectively formed beside the two first lens portions 13. Each positioning post 110 has a truncated cone shape, with a diameter thereof gradually decreasing away from the first end surface 115. Each protrusion 111 is formed on a side of the positioning post 110 away the first lens portion 13.

The first main body 113 and the first lens portions 13 are made of transparent material such as known kinds of plastic in a unitary piece formed by common injection molding. Those with ordinary skill in the present art can select and utilize suitable transparent material to manufacture the first main body 113 and the first lens portions 13 according to individual needs. For instance, the transparent material can be polymethyl methacrylate (PMMA), or polycarbonate (PC).

The female connector 12 has a configuration substantially similar to the male connector 11. In detail, referring to FIGS. 2 and 4, the female connector 12 includes a second main body 123, four second lens portions 14, and four second optical fibers 124. The second main body 123 includes a second end surface 125, two positioning slits 120 and two recesses 121. The four second lens portions 14 protrude from the male connector 11 at the second end surface 125. Each second lens portion 14 includes a second optical surface 141 and a second coupling surface 142 opposite to the second optical surface 141. The two positioning slits 120 are defined from the second end surface 125 towards an inner portion thereof and beside the distal two second lens portions 14. Each of the two positioning slits 120 is configured for fittingly receiving a corresponding positioning post 110. Each recess 121 is formed in the second end surface 125, and at a side of the positioning slit 120 away the second lens portion 14. Additionally, each recess 121 communicates with a corresponding positioning slit 120.

The second main body 123 and the second lens portion 14 are made of transparent material such as known kinds of plastic in a unitary piece formed by standard injection molding. For instance, the transparent material can be polymethyl methacrylate (PMMA), or polycarbonate (PC).

Figure 4:
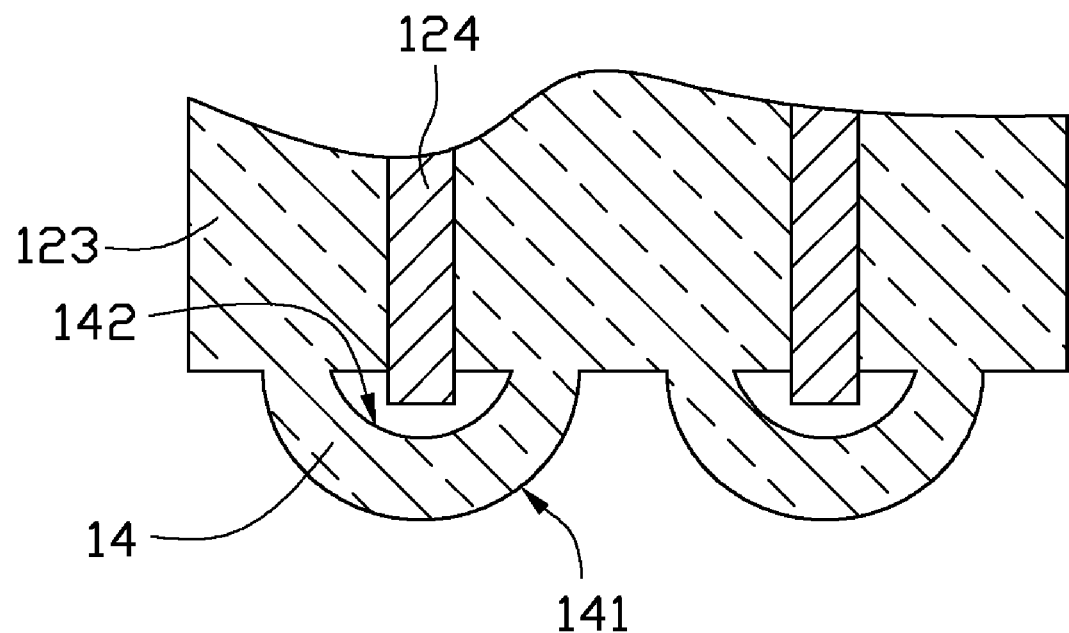
FIG. 4 is a cross-sectional view of the female connector, taken along line IV-IV.

Referring to FIGS. 3 to 4, the four first optical fibers 114 are accommodated in the first main body 113, and the four second optical fibers 124 are accommodated in the second main body 123. Each of the first optical fibers 114 is optically coaxial with a corresponding first lens portion 13 with one end thereof adjacent to the first coupling surface 132 and focused with the first lens portion 13. Each of the second optical fibers 124 is optically coaxial with a corresponding second lens portion 14 with one end thereof adjacent to the second coupling surface 142 and focused with the second lens portion 14. Each first optical fiber 111 and second optical fiber 121 has a structure similar to a standard optical fiber, including an inner core for transmitting signals, an outer insulated layer, and an intermediate glass fiber.

Additionally, to resist abrasion, a coating layer can be respectively formed on the positioning posts 110 and an inner surface 126 of the second main body 123 in the positioning slits 120 and the recesses 121.

When in use, the male connector 11 is inserted into the female connector 12. That is, the recesses 121 receives the protrusions 111, the positioning slits 120 receive the positioning posts 110 with the first end surface 115 facing the second end surface 125. In this manner, the first lens portions 13 are ensured to be optically coaxial with the second lens portions 14, and transmission loss between the female connector 12 and the male connector 11 is reduced.

The described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An optical fiber connector, comprising:
a female connector including a first main body and a first lens portion, the first main body comprising at least one positioning slit and at least one recess, wherein the at least one recess is communicated with the corresponding at least one positioning slit and is eccentric relative to the corresponding at least one positioning slit; and
a male connector for engagement with the female connector, the male connector comprising a second main body and a second lens portion for optically coupling with the first lens portion, the second main body comprising at least one positioning post configured for insertion into the corresponding at least one positioning slit and at least one protrusion protruding from the at least one positioning post configured for insertion into the corresponding at least one recess.

2. The optical fiber connector of claim 1, wherein the at least one positioning slit and the first lens portion are arranged at a common side of the first main body.

3. The optical fiber connector of claim 1, wherein the at least one positioning post comprises two positioning posts respectively arranged at opposite sides of the second lens portion and the at least one protrusions comprises two protrusions protruding from the respective positioning posts, each of the protrusions extending in a direction away from the second lens portion.

4. The optical fiber connector of claim 1, wherein an anti-abrasive coating is formed over an outer surface of the at least one positioning post and the inner surface in the at least one positioning slit.

5. The optical fiber connector of claim 1, further comprising two optical fibers respectively received in the first and second main bodies and optically coupled with the first and second lens portions respectively.

6. The optical fiber connector of claim 1, wherein each of the at least one positioning post has a truncated cone shape.

\* \* \* \* \*